United States Patent
Ding et al.

(10) Patent No.: US 9,323,865 B2
(45) Date of Patent: Apr. 26, 2016

(54) CONTENT ALIGNMENT METHOD AND SYSTEM

(71) Applicant: TCL RESEARCH AMERICA INC., Santa Clara, CA (US)

(72) Inventors: Hao Ding, Santa Clara, CA (US); Jia Huang, Santa Clara, CA (US); Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 210 days.

(21) Appl. No.: 14/139,918

(22) Filed: Dec. 24, 2013

(65) Prior Publication Data

US 2015/0178369 A1    Jun. 25, 2015

(51) Int. Cl.
*G06F 17/30*     (2006.01)
*H04N 21/488*     (2011.01)

(52) U.S. Cl.
CPC .... *G06F 17/30961* (2013.01); *G06F 17/30327* (2013.01); *H04N 21/4884* (2013.01)

(58) Field of Classification Search
None
See application file for complete search history.

(56) References Cited

U.S. PATENT DOCUMENTS

| | | | | |
|---|---|---|---|---|
| 4,282,403 | A * | 8/1981 | Sakoe | G06K 9/6206 382/215 |
| 6,446,060 | B1 * | 9/2002 | Bergman | G06F 17/3025 707/770 |
| 6,477,185 | B1 * | 11/2002 | Komi | G11B 20/10527 348/423.1 |
| 2002/0087569 | A1 * | 7/2002 | Fischer | H04N 21/235 |
| 2009/0132599 | A1 * | 5/2009 | Soroushian | G06F 17/30017 |
| 2009/0259633 | A1 * | 10/2009 | Bronstein | G06F 17/30799 |
| 2011/0022638 | A1 * | 1/2011 | Jiang | G06F 17/30743 707/797 |
| 2012/0311043 | A1 * | 12/2012 | Chen | H04N 21/23406 709/204 |
| 2013/0204908 | A1 * | 8/2013 | Gehani | G11B 27/00 707/805 |
| 2013/0216202 | A1 * | 8/2013 | Palakshamurthy | H04N 9/8715 386/241 |

* cited by examiner

*Primary Examiner* — Robert Beausoliel, Jr.
*Assistant Examiner* — Nirav K Khakhar
(74) *Attorney, Agent, or Firm* — Anova Law Group, PLLC

(57) ABSTRACT

A method is provided for content alignment. The method includes obtaining a first content sequence and a second content sequence different from the first content sequence. The method also includes representing each of the first content sequence and the second content sequence in a hierarchical structure containing an ordered root element sequence and a sub-tree structure. The ordered root element sequence includes a plurality of root elements and each root element is associated with a sub-tree of elements. The method also includes determining a desired alignment between the first content sequence and the second content sequence using dynamic programming, and outputting results of the desired alignment between the first content sequence and the second content sequence.

20 Claims, 5 Drawing Sheets

CONTENT ALIGNMENT METHOD AND SYSTEM

FIELD OF THE INVENTION

The present invention generally relates to digital content processing technologies and, more particularly, to methods and systems for content matching, alignment, and presentation.

BACKGROUND

Information in most media applications is organized in hierarchical structures, for example, typical online book stores have shopping categories of book->science-fiction/non-fiction, while scientific papers and movie subtitles are organized in a structure of paragraph, sentence, word and characters; video data is described as scenes, shots, frames, blocks and pixels.

However, these hierarchical structures are not unified or standardized. FIG. 1A shows a goods taxonomy of Amazon, and FIG. 1B shows a goods taxonomy of Yahoo! Shopping. As shown in FIG. 1A and FIG. 1B, the "Magazines" is a second-level category in Amazon while a first-level item in Yahoo!. Further, some item in the one structure (e.g., "Kindle books") does not exist in the other. The structural differences may become challenging for applications that need to access items of both taxonomies.

The disclosed method and apparatus are directed to solve one or more problems set forth above and other problems.

BRIEF SUMMARY OF THE DISCLOSURE

One aspect of the present disclosure includes a method for content alignment. The method includes obtaining a first content sequence and a second content sequence different from the first content sequence. The method also includes representing each of the first content sequence and the second content sequence in a hierarchical structure containing an ordered root element sequence and a sub-tree structure. The ordered root element sequence includes a plurality of root elements and each root element is associated with a sub-tree of elements. The method also includes determining a desired alignment between the first content sequence and the second content sequence using dynamic programming, and outputting results of the desired alignment between the first content sequence and the second content sequence.

Another aspect of the present disclosure includes a content alignment system. The content alignment system includes a memory module, an output interface, and a processor. The processor is coupled to the memory module and the output interface and is configured to obtain a first content sequence and a second content sequence different from the first content sequence and to represent each of the first content sequence and the second content sequence in a hierarchical structure containing an ordered root element sequence and a sub-tree structure. The ordered root element sequence includes a plurality of root elements and each root element is associated with a sub-tree of elements. The processor is further configured to determine a desired alignment between the first content sequence and the second content sequence using dynamic programming, and to output results of the desired alignment between the first content sequence and the second content sequence through the output interface.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 2:
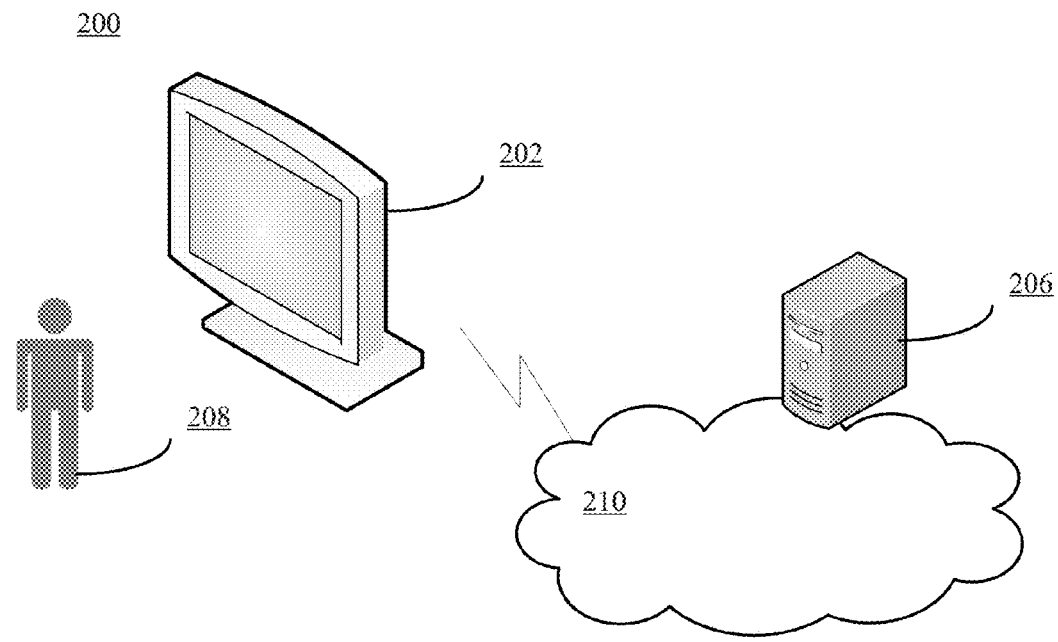
FIG. 2 illustrates an exemplary environment incorporating certain embodiments of the present invention.

FIG. 2 illustrates an exemplary environment 200 incorporating certain embodiments of the present invention. As shown in FIG. 2, environment 200 includes a terminal 202, a server 206, a network 210, and a user 208. Other components may also be included.

Terminal 202 may include any appropriate type of user terminal or any type of computing equipment. For terminal 202 may include a TV, such as plasma TV, LCD TV, projection TV, non-smart TV, or smart TV, a personal computer (PC), a tablet or mobile computer, or a smart phone, etc. Although only one terminal 202 is included, any number of terminals may be included.

Server 206 may include any appropriate type of server. For example, server 206 may include a web server, a content server, an application server, a database server, etc. Although only one server 206 is shown, any number of servers may be included.

Further, the network 210 may include any appropriate type of computer or communication network, such as the Internet. Also, the network 210 may also include a cloud computing environment. Terminal 202 and server 206 may communicate with each other through the network 210.

Figure 3:
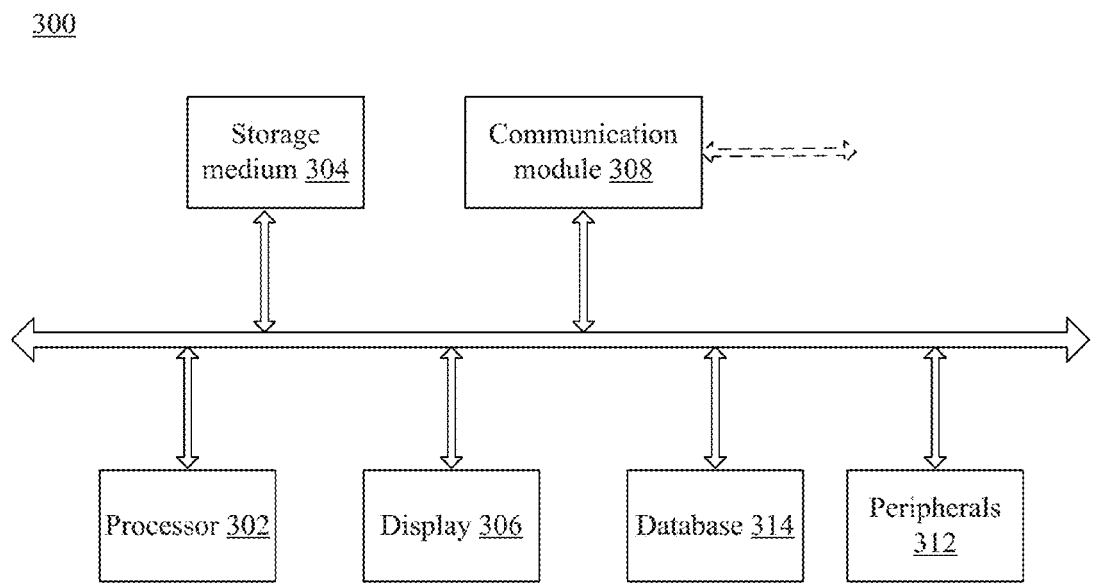
FIG. 3 illustrates an exemplary computing system consistent with the disclosed embodiments.

Terminal 202 and/or server 206 may be implemented on any appropriate computing circuitry platform. FIG. 3 shows a block diagram of an exemplary computing system 200 capable of implementing terminal 202 and/or server 206.

As shown in FIG. 3, computing system 300 may include a processor 302, a storage medium 304, a monitor 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as ROM, RAM, flash memory modules, and mass storages, such as CD-ROM and hard disk, etc. Storage medium 304 may store computer programs for implementing various processes, when the computer programs are executed by processor 302.

Further, peripherals 312 may include various sensors and other I/O devices, such as keyboard and mouse, and communication module 308 may include certain network interface devices for establishing connections through communication networks. Database 310 may include one or more databases for storing certain data and for performing certain operations on the stored data, such as database searching.

Figure 4:
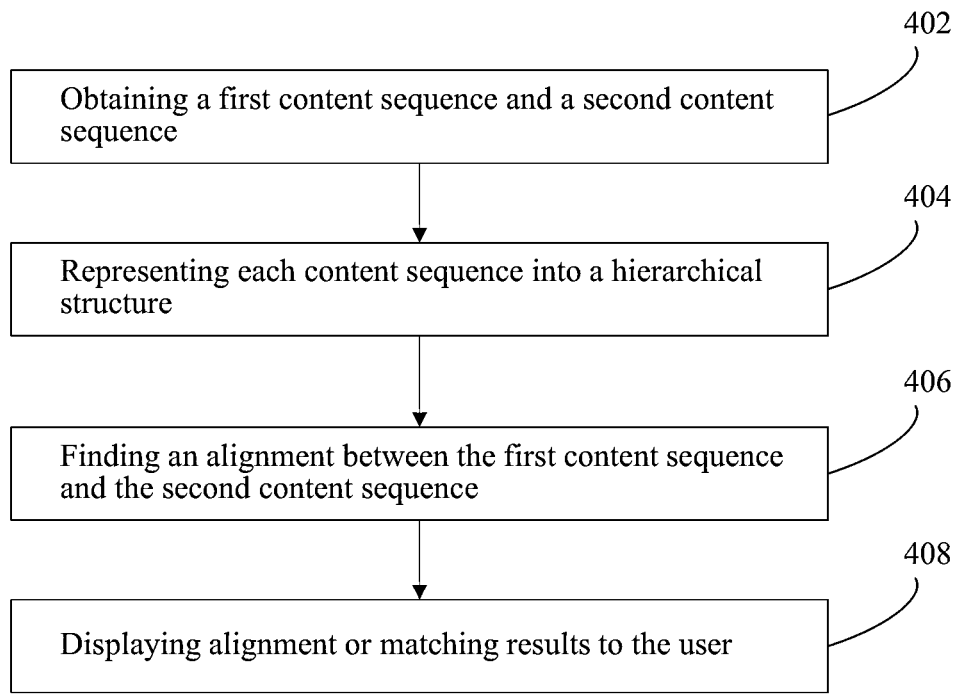
FIG. 4 illustrates a flow chart of an exemplary content alignment process consistent with the disclosed embodiments.

In operation, terminal 202 and/or server 206 may implement a content analyzing process for searching, comparing, and aligning content sequences inputted into the terminal 202 and/or server 206. FIG. 4 illustrates a flow chart of an exemplary content alignment process by computing system 300 consistent with the disclosed embodiments. The content matching process may be implemented on terminal 202, server 206, or both terminal 202 and server 206.

As shown in FIG. 4, at the beginning, a first content sequence and a second content sequence are obtained (402). The content sequences may include any appropriate contents. For example, the first content sequence and the second content sequence may be web contents, or the first content sequence and the second content sequence may be video sequences. Any content with sequential structure may be used.

Further, computing system 300 (e.g., processor 302) may obtain the first content sequence and the second content sequence from input devices, from storage devices, or from the network communication interface. After obtaining the first content sequence and the second content sequence (402), the processor 302 may represent each the first content sequence and the second content sequence in a hierarchical structure (404).

Figure 5:
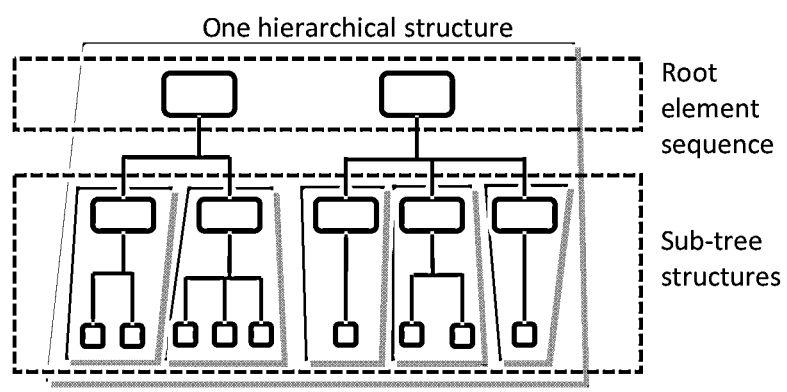
FIG. 5 illustrates an exemplary representation of a content sequence consistent with the disclosed embodiments.

For example, as shown in FIG. 5, a content sequence (e.g., first content sequence, second content sequence) is represented in a hierarchical structure. Each of the first content sequence and the second content sequence may include a root element sequence and a sub-tree structure. That is, the hierarchical structure includes a root element sequence containing one or more element, and each root element may have a sub-tree structure. The hierarchical structure may then be divided into different levels, with the root element at the highest level, and the level decreases sequentially along the level of the sub-tree structure.

That is, the hierarchical structure may include any levels, and each level may be one or more sequences of elements. For example, a K-level hierarchical structure Z (e.g., S1 or S2) may be composed of an ordered sequence (the sequence can be only one component) of successive K-level tree structures. As shown in FIG. 4, Z can be treated as a composition of an ordered sequence of root elements on the $K^{th}$ level (denoted as r(Z)) plus an ordered sequence of remaining (K−1)-level sub-tree structures (denoted as sub (Z)) belonging to these roots, i.e., $$Z=r(Z)+\text{sub}(Z) \tag{1}$$

An ordered sequence of sub-tree structures can also be viewed as a complete hierarchical structure which is composed of a set of root elements, which represents the characteristics of the structures on this level, and sub-tree structures inside these structures. In other words, the set of root elements can be represented by a feature vector according to the type of class they belong to and roles they played on the same level.

For instance, a movie subtitle can be simplified as a three-level structure of "paragraph-sentence-word". On the paragraph level, features may include the type of paragraphs such as narration, exposition, definition, description, comparison, process analysis and persuasion, as well as roles they played in the subtitle such as head, body and conclusion. The features on the sentence level include sentence types such as statement, question, command and exclamation, as well as their roles such as topic sentence, supportive sentence, concluding sentence and example. Further, the word level features include part of speech such as noun, verb, adjective, adverb and so on, as well as their roles played in sentence such as subject, predicate, object and so on.

Figure 6:
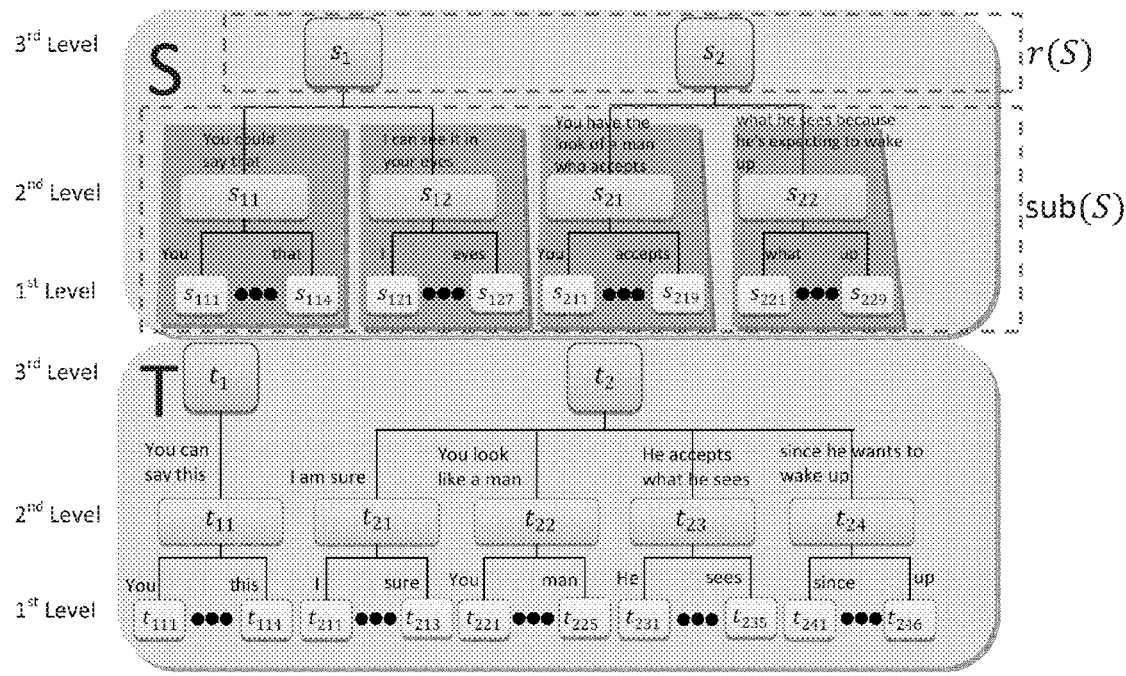
FIG. 6 illustrates two exemplary content sequences to be aligned consistent with the disclosed embodiments.

FIG. 6 illustrates two exemplary hierarchical subtitles S and T. For illustrative purposes, S and T are extracts of two subtitle versions of the movie "The Matrix". As shown in FIG. 6, subtitle sequence S is represented as a hierarchical structure having two root elements $s_1, s_2$, and a 2-level sub-tree structure. The subtitle sequence T is also represented as a hierarchical structure having two root elements $t_1, t_2$, and a 2-level sub-tree structure.

The root elements r(S) represents the characteristics of $s_1 s_2$ on the level of paragraph, while the sub-tree structures sub (S) are all the sentences in these two paragraphs, as well as all the words belonging to these sentences. The root elements r(T) represents the characteristics of $t_1 t_2$ on the level of paragraph, while the sub-tree structures sub (T) are all the sentences in these two paragraphs, as well as all the words belonging to these sentences.

More specifically, the $3^{rd}$ level element $s_1$ represents the first paragraph in the subtitle S, and the $3^{rd}$ level element $s_2$ represents the second paragraph in the subtitle S. The $2^{nd}$ level element $s_{11}$: "You could say that" represents the $1^{st}$ sentence in paragraph $s_1$, and $2^{nd}$ level element $s_{12}$: "I can see it in your eyes" represents the $2^{nd}$ sentence in paragraph $s_1$.

The $2^{nd}$ level element $s_{21}$: "You have the look of a man who accepts" represents the $1^{st}$ sentence in paragraph $s_2$, and $2^{nd}$ level element $s_{22}$: "What he sees because he's expecting to wake up" represents the $2^{nd}$ sentence in paragraph $s_2$.

The $1^{st}$ level element $s_{111}$: "You" represents the $1^{st}$ word in sentence $s_{11}$, and $1^{st}$ level element $s_{114}$: "that" represents the last word in sentence $s_{11}$. The $1^{st}$ level element $s_{121}$: "I" represents the $1^{st}$ word in sentence $s_{12}$, and $1^{st}$ level element $s_{127}$: "eyes" represents the last word in sentence $s_{12}$. The $1^{st}$ level element $s_{211}$: "You" represents the $1^{st}$ word in sentence $s_{21}$, and $1^{st}$ level element $s_{219}$: "accepts" represents the last word in sentence $s_{21}$. The $1^{st}$ level element $s_{221}$: "what" represents the $1^{st}$ word in sentence $s_{22}$, and $1^{st}$ level element $s_{229}$: "up" represents the last word in sentence $s_{22}$.

Similarly, the $3^{rd}$ level element $t_1$ represents the first paragraph in the subtitle T, and the $3^{rd}$ level element $t_2$ represents the second paragraph in the subtitle T. The $2^{nd}$ level element $t_{11}$: "You could say this" represents the $1^{st}$ sentence in paragraph $t_1$.

The $2^{nd}$ level element $t_{21}$: "I am sure" represents the $1^{st}$ sentence in paragraph $t_2$, the $2^{nd}$ level element $t_{22}$: "You look like a man" represents the $2^{nd}$ sentence in paragraph $t_2$, the $2^{nd}$ level element $t_{23}$: "He accepts what he sees" represents the $3^{rd}$ sentence in paragraph $t_2$, and the $2^{nd}$ level element $t_{24}$: "since he wants to wake up" represents the $4^{th}$ sentence in paragraph $t_2$.

The $1^{st}$ level element $t_{111}$: "You" represents the $1^{st}$ word in sentence $t_{11}$, and $1^{st}$ level element $t_{114}$: "this" represents the last word in sentence $t_{11}$. The $1^{st}$ level element $t_{211}$: "I" represents the $1^{st}$ word in sentence $t_{21}$, and $1^{st}$ level element $t_{213}$: "sure" represents the last word in sentence $t_{21}$. The $1^{st}$ level element $t_{221}$: "You" represents the $1^{st}$ word in sentence $t_{22}$, and $1^{st}$ level element $t_{225}$: "man" represents the last word in sentence $t_{22}$. The $1^{st}$ level element $t_{231}$: "He" represents the $1^{st}$ word in sentence $t_{23}$, and $1^{st}$ level element $t_{235}$: "sees" represents the last word in sentence $t_{23}$. The $1^{st}$ level element $t_{241}$: "since" represents the $1^{st}$ word in sentence $t_{24}$, and $1^{st}$ level element $t_{246}$: "up" represents the last word in sentence $t_{24}$.

Further, returning to FIG. 4, after representing each the first content sequence and the second content sequence in a hierarchical structure (404), processor 302 may find an alignment between the first content sequence and the second content sequence (406).

To find the alignment between two sequences X and Y, of sizes |X| and |Y|, respectively, $$X = x_1 \ldots x_m \ldots x_{|X|}$$

$$Y = y_1 \ldots y_n \ldots y_{|Y|}$$

may be treated as constructing an alignment L(X, Y) where each component is an aligned pair. This aligned pair is an element pair (x_m, y_n) when two elements are aligned, or an indel pair (x_m, null) or (null, y_n) when one element is aligned with a null.

Figure 7:
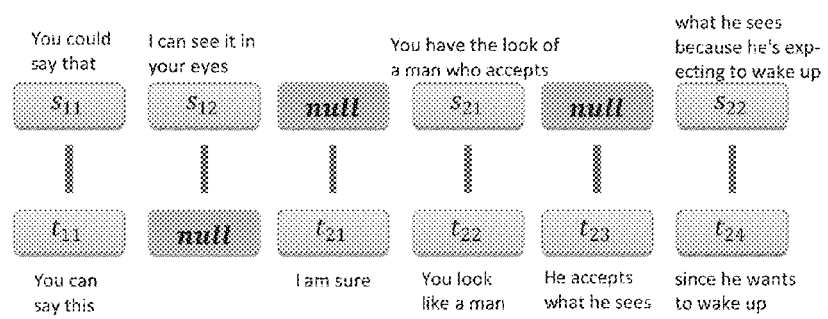
FIG. 7 illustrates an exemplary alignment of certain elements consistent with the disclosed embodiments.
Figure 8:
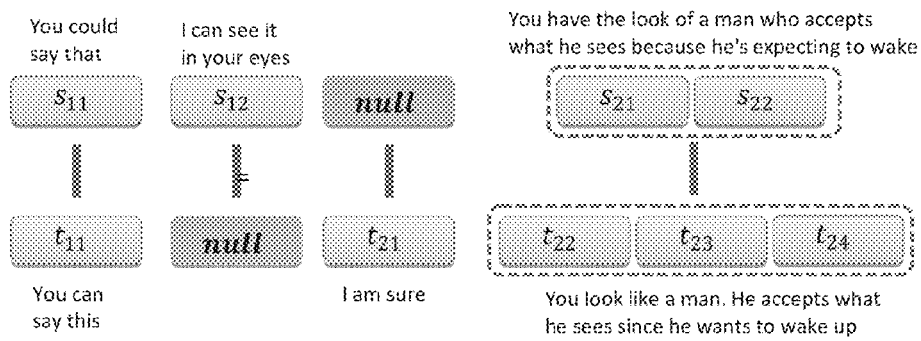
FIG. 8 illustrates another exemplary alignment of certain elements consistent with the disclosed embodiments.
Figure 9:
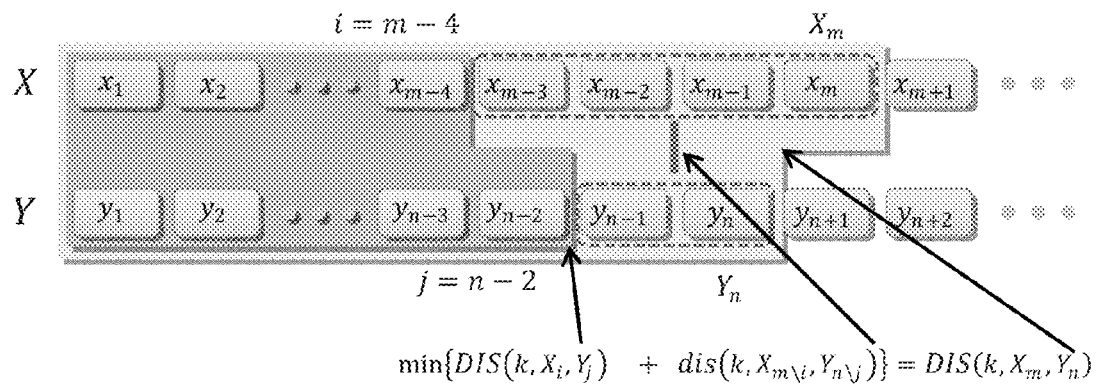
FIG. 9 illustrates exemplary distance determination consistent with the disclosed embodiments.

For instance, in FIG. 7, X and Y are 2nd-level element sequences in the movie subtitle structure, X=s_11 s_12 s_21 s_22 and Y=t_11 t_21 t_22 t_23 t_24 and one alignment between them is displayed in FIG. 8.

$$\mathcal{L}(X,Y) = [(s_{11},t_{11}),(s_{12},\text{null}),(\text{null},t_{21}),(s_{21},t_{22}),$$
$$(\text{null},t_{23}),(s_{22},t_{24})]$$

The total distance of alignment can be represented as the summation of dissimilarities of all aligning pairs in the alignment. Then the total distance of alignment $\mathcal{L}(X, Y)$ can be computed as $dis(s_{11}, t_{11})+dis(s_{12}, \text{null})+dis(\text{null}, t_{21})+dis(s_{21}, t_{22})+dis(\text{null}, t_{23})+dis(s_{22}, t_{24})$. Here, $dis(s_{11}, t_{11})$ denotes the dissimilarity of aligning pair $(s_{11}, t_{11})$.

Although summation is used in the exemplary sequential alignment to calculate the total distance, other variations of the additive function, for example, weighted summation, multiplication, and so on, may also be used. In addition, certain distance measurement may be needed for obtaining the distance of the indel pair that involves alignment to a null.

An optimal or desired alignment is the one among all feasible alignments that can give the minimal total distance. Further, multiple elements can be aligned at one time when trying to find optimal alignment. In certain embodiments, the concatenation of several elements from one sequence can be best aligned with the element in the other sequence.

For example, in the alignment of $X = s_{11}s_{12}s_{21}s_{22}$ and $Y = t_{11}t_{21}t_{22}t_{23}t_{24}$, the result shows that the concatenation of $s_{21}$ (You have a look of a man who accepts) and $s_{22}$ (what he sees because he's expecting to wake up) can be best aligned with the concatenation of $t_{22}$ (You look like a man), $t_{23}$ (He accepts what he sees) and $t_{24}$ (since he wants to wake up) as shown in FIG. 7.

Thus, alignment $\mathcal{L}^*(X, Y)$ including structure pair $(s_{21}s_{22}, t_{22}t_{23}t_{24})$ outperforms the alignment obtained from the one-to-one element aligning method since it gives less total distance. Therefore, multiple-element aligning may be taken into consideration.

$$\mathcal{L}^*(X,Y) = [(s_{11},t_{11}),(s_{12},\text{null}),(\text{null},t_{21}),(s_{21}s_{22},$$
$$t_{22}t_{23}t_{24})]$$

Thus, the objective is to find the optimal alignment to achieve minimum distance between any two K-level hierarchical structures S and T.

The alignment $\mathcal{L}(S, T)$ between two structures S and T may be defined as aligning the sequence of tree structures in S with the sequence of tree structures in T. Each aligning pair $(s, t) \in \mathcal{L}(S, T)$ can be a pair of K-level tree structures or an indel pair where one structure is aligned with a null. The optimal alignment is in the set of all feasible alignments $\{\mathcal{L}(S, T)\}$.

Let DIS(K, S, T) to denote the distance between two K-level hierarchical structures S and T with the optimal alignment. Then, it is the minimal distance of alignment among all feasible alignments, $$DIS(K, S, T) = \min_{\mathcal{L} \in \{\mathcal{L}(S,T)\}} \left( \sum_{(s,t) \in \mathcal{L}} dis(K, s, t) \right) \quad (2)$$

where dis(K,s,t) denotes the dissimilarity of the K-level aligning pair (s,t).

According to the composition of one hierarchical structure defined in (1), the dissimilarity dis(K,s,t) relies on two factors: the distance between the $K^{th}$-level root elements r(s) and r(t), denoted as $dis_r(K,r(s),r(t))$, and the distance between two (K−1)-level sub-tree structures sub(s) and sub(t) with the optimal alignment, that is, DIS(K−1,sub(s),sub(t)), $$dis(K, s, t) = \begin{cases} dis_r(K, r(s), r(t)) \oplus DIS(K-1, sub(s), sub(t)), & K > 1 \\ dis_r(K, r(s), r(t)), & K = 1 \end{cases} \quad (3)$$

Hence, DIS(K,S, T) has the following expression:

$$DIS(K, S, T) = \begin{cases} \min_{\mathcal{L} \in \{\mathcal{L}(S,T)\}} \left( \sum_{(s,t) \in \mathcal{L}} [dis_r(K, r(s), r(t)) \oplus \\ DIS(K-1, sub(s), sub(t))] \right), & K > 1 \\ \min_{\mathcal{L} \in \{\mathcal{L}(S,T)\}} \left( \sum_{(s,t) \in \mathcal{L}} [dis_r(K, r(s), r(t))] \right), & K = 1 \end{cases} \quad (4)$$

The interaction $\oplus$ in (3) and (4) is an abstraction of such type of operations, which can be addition, multiplication, or sum of squares, or others. Exact formation of this interaction may vary depending on the specific applications. For example, if weighted linear additional function is selected, (4) can be rewritten as $$DIS(K, S, T) = \quad (5)$$

$$\begin{cases} \min_{\mathcal{L} \in \{\mathcal{L}(S,T)\}} \left( \sum_{(s,t) \in \mathcal{L}} [\alpha * dis_r(K, r(s), r(t)) + (1-\alpha) * \\ DIS(K-1, sub(s), sub(t))] \right), & K > 1 \\ \min_{\mathcal{L} \in \{\mathcal{L}(S,T)\}} \left( \sum_{(s,t) \in \mathcal{L}} [dis_r(K, r(s), r(t))] \right), & K = 1 \end{cases}$$

where the weights are determined by the application.

If the aligning pair is an indel, e.g., (s,null), the dissimilarity of this indel dis(K,s,null) may be defined as a penalty, $dis_r$(K,r(s),null) and D is (K−1,sub(s),null) will be given two corresponding penalty values.

On the other hand, there may be two types of distance in Eq. (4), the distance of structure and the distance of root elements. The former can be handled by the recursive function in Eq. (4). As mentioned earlier, the root elements are represented by vector of features, depending on the applications, the value of vector can be Boolean or normalized real numbers in [0, 1], thus Euclidean distance can be used as a measurement for the distance between vectors, that is:

$$dis_r(K, r(S), r(T)) = \| \vec{V}(r(s)) - \vec{V}(r(t)) \|_F \quad (6)$$

where $\vec{V}(r(\sim))$ is the feature vector of a root element.

Table 1 below shows an example of the features where each feature is a Boolean value. As features indicated, the root element $s_{22}$ is a statement and is supportive, and the root element $t_{21}$ is a statement and a conclusion. The distance between them equals to $\|<1,0,0,0,0,1,0,0> - <1,0,0,0,0,0,1,0>\|_F = \sqrt{2}$.

TABLE 1

Feature vectors for root element $s_{22}$ and $t_{21}$

| Features | | $s_{22}$ what he sees because he's expecting to wake up | $t_{21}$ I am sure |
|---|---|---|---|
| Sentence Types | statement | 1 | 1 |
| | question | 0 | 0 |
| | command | 0 | 0 |
| | exclamation | 0 | 0 |
| Roles | topic | 0 | 0 |
| | support | 1 | 0 |
| | conclusion | 0 | 1 |
| | example | 0 | 0 |

As shown in Table 1, the feature vectors for different levels of the root elements might be different, thus feature vectors participating in the calculation of Eq. (6) might vary across the levels of the structure.

As shown in Eq. (4), the desired distance can be obtained by finding the alignment solution for the root elements that can minimize the distance in the equation. The property of sequential structure may need to be defined.

According to disclosed embodiments, considering two k-level root elements X and Y, $X_m = x_1 \ldots x_m$ represents the partial sequence consisting of the first m elements in X, and $X_{|X|\backslash m} = X - X_m = x_{m+1} \ldots x_{|X|}$ is the remaining part of X. Likewise we have $Y_n = y_1 \ldots y_n$, $Y_{|Y|\backslash n} = y_{n+1} \ldots y_{|Y|}$, then $$DIS(k, X_m, Y_n) = \min_{(i,j) \in [(0,0),(m,n))} \{DIS(k, X_i, Y_j) + dis(k, X_{m\backslash i}, Y_{n\backslash j})\} \quad (7)$$

This is the case because it can be found that the last aligning pair in the total alignment $\mathcal{L}(X_m, Y_n)$ can only belong to one of the following cases:

1) $x_m$ aligned with $y_n$: $(x_m, y_n)$
2) $x_m$ aligned with a null: $(x_m, \text{null})$
3) $y_n$ aligned with a null: $(\text{null}, y_n)$
4) $x_m$ aligned with any partial sequence in Y including $y_n$: $(x_m, y_j \ldots y_n)$, $1 \leq j < n$
5) Any partial sequence in X including $x_m$ aligned with $y_n$: $(x_i \ldots x_m, y_n)$, $1 \leq i < m$
6) Any partial sequence in X including $x_m$ aligned with any partial sequence in Y including $y_n$: $(x_i \ldots x_m, y_j \ldots y_n)$, $1 \leq i < m$, $1 \leq j < n$ The distance $DIS(k, X_m, Y_n)$ comes from the dissimilarity of the last aligning pair plus the best alignment distance for the preceding partial sequences (as shown in FIG. 8). Hence, $$DIS(k, X_m, Y_n) = \min_{\substack{1 \leq i < m \\ 1 \leq j < n}} \left\{ \begin{array}{l} DIS(k, X_{m-1}, Y_{n-1}) + dis(k, x_m, y_n), \\ DIS(k, X_{m-1}, Y_n) + dis(k, x_m, \text{null}), \\ DIS(k, X_m, Y_{n-1}) + dis(k, \text{null}, y_n), \\ DIS(k, X_{m-1}, Y_{j-1}) + dis(k, x_m, y_j \ldots y_n), \\ DIS(k, X_{i-1}, Y_{n-1}) + dis(k, x_i \ldots x_m, y_n), \\ DIS(k, X_{i-1}, Y_{j-1}) + dis(k, x_i \ldots x_m, y_j \ldots y_n) \end{array} \right\} =$$

$$\min_{(i,j) \in [(0,0),(m,n))} \{DIS(k, X_i, Y_j) + dis(k, X_{m\backslash i}, Y_{n\backslash j})\}$$

Therefore, the DIS(K,S, T) in Eq. (4) can be obtained from Eq. (7) by letting k=K, $X_m$=S, $Y_n$=T. The Eqn. (7) indicates a recursive process because, in order to obtain DIS(k, $X_m$, $Y_n$), the values of all the shorter sequence distances DIS(k, $X_i$, $Y_j$) ($0 \leq i < m$, $0 \leq j < n$) need to be known in advance. To avoid unnecessary duplicate computation, it can be started from the 's' to smallest case DIS(k, $X_0$, $Y_0$), then proceed by adding one element in one of both sequence till getting the final DIS(K, S, T).

By integrating (3) to (7), the overall recursive formula is given below:

$$DIS(k, X_m, Y_n) = \quad (8)$$

$$\begin{cases} \min_{(i,j) \in [(0,0),(m,n))} \begin{array}{l} \{DIS(k, X_i, Y_j) + \\ dis_r(r(X_{m\backslash i}), r(Y_{n\backslash j})) \oplus \\ DIS(k-1, sub(X_{m\backslash i}), sub(Y_{n\backslash j}))\}, \end{array} & 1 < k \leq K \\ \min_{(i,j) \in [(0,0),(m,n))} \{DIS(k, X_i, Y_j) + dis_r(r(X_{m\backslash i}), r(Y_{n\backslash j}))\}, & k = 1 \end{cases}$$

The interaction $\oplus$ in (8) is still kept in the formula since in different specific situations it indicates different forms.

Thus, based on the recursive functions Eq. (8), dynamic programming can be applied to achieve the overall optimal alignment of two structures. The algorithm goes from the bottom level to the top level to get each level of distances DIS(k,.,.) until the $K^{th}$ level.

The total number of feasible alignments between two K-level hierarchical structures rises up to $0 (2^{K(|S'|+|T'|)} \max(|S'|, |T'|)^{K \min(|S'|, |T'|)})$, which would be unreachable by current computation capability when the number of elements in the sequence rises up to thousand level (S' and T' are the sets of all $1^{st}$ level elements in the K-level hierarchical structures S and T).

Because the disclosed embodiments are based on a dynamic programming technique, which can greatly speed up the computing efficiency by decreasing the time complexity down to $\Sigma_{i=1}^{|S'|} \Sigma_{j=1}^{|T'|}((i+1)(j+1)-1) = O((|S'||T'|)^2)$ on one single level. Thus, the total complexity considering the dynamic programming on different levels would be $O((|S'||T'|)^2 K)$.

Returning to FIG. 4, after finding an alignment between the first content sequence and the second content sequence (406), the processor 302 may displaying the alignment or matching results to the user (408). For example, processor 302 may mark the first content sequence and the second content sequence and display the marked first content sequence and second content sequence such that the user can understand the results in a side-by-side comparison format. The processor 302 may generate a report recording the matching or alignment results.

Figure 1A:
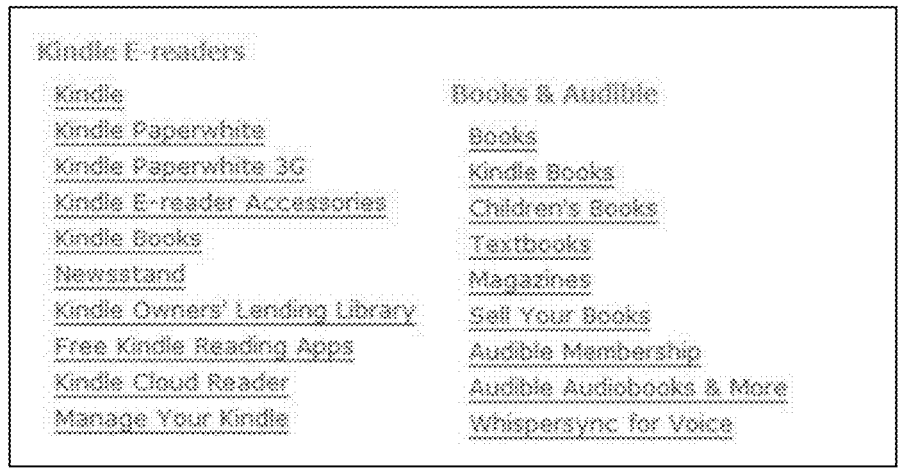
FIG. 1A shows an existing goods taxonomy.
Figure 1B:
FIG. 1B shows another existing goods taxonomy.

Further, the processor 302 may also integrate the matched or aligned first content sequence and second content sequence to produce an integrated sequence for further processing or for being displayed to the user, such as a complete list of similar items from two or more different websites. For example, as shown in FIG. 1A and FIG. 1B, the processor 302 may align contents on the Amazon webpage and contents on the Yahoo! Shopping webpage, and display common contents in a separate webpage such that the user can find common items on both Amazon and Yahoo! Shopping. Other methods and processing may also be used.

Thus, according to disclosed embodiments, two sequential structures can be aligned, each medium with a hierarchical structure, and an optimal alignment between two media with the minimal distance of the corresponding structures can be determined. The distance of alignment may be the summation of costs of all aligning pairs in the alignment. In addition, by representing a structure with a root element sequence and sub-tree structures, the cost of a pair of two structures is obtained from distance of their root node sequences and the optimal alignment distance of their sub-tree structures. Thus, based on the observation that the recursive and additive characteristics of structure construction reflect the inherent properties of media, dynamic programming can be applied to solving an optimization problem that minimizes the distance between media, consequently, the hierarchical alignment can be achieved.

Although the above examples use sub-titles, other type of medium, such as video data may also similarly used. For video contents, video scenes, shots, frames, and blocks may be used as elements or features to align video contents, i.e., in a "scene-shot-frame-block" structure.

By using the disclosed methods and systems, a variety of content matching applications can be implemented. For example, plagiarists often modify the structure of the original paper to escape inspection. They may combine several paragraphs or sentences into one, separate one sentence into short pieces, or paraphrase them. Universities and publishers wish to find out how to detect plagiarism more accurately to protect copyrights.

Further, foreign language learners use foreign movie titles (with subtitles) to practice their language capabilities. The subtitles can be obtained from two different sources, either downloaded from Internet that may not match exactly with the version of title in play, or obtained from OCR (optical character recognition) tools that may contain errors. How to make use of both sources to achieve an accurate subtitle is interesting for these learners.

With disclosed matching/alignment algorithm based methods and systems for handling hierarchical information pieces, book store managers can build taxonomy for their new bookstores supporting both Amazon and Yahoo! Shopping's taxonomies; universities and publishers can detect plagiarism by aligning suspicious documents and source documents [13]; and foreign language learners can get correct subtitles of TV shows by aligning the OCR subtitles with the one found online.

Those skilled in the art should understand that all or part of the steps in the above method may be executed by relevant hardware instructed by a program, and the program may be stored in a computer-readable storage medium such as a read only memory, a magnetic disk, a Compact Disc (CD), and so on.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for content alignment, comprising:
   obtaining a first content sequence and a second content sequence different from the first content sequence;
   representing each of the first content sequence and the second content sequence in a hierarchical structure containing an ordered root element sequence and a sub-tree structure, wherein the ordered root element sequence includes a plurality of root elements and each root element is associated with a sub-tree of elements;
   determining a desired alignment between the first content sequence and the second content sequence using dynamic programming; and
   outputting results of the desired alignment between the first content sequence and the second content sequence;
   wherein:
   the hierarchical structure is divided into a plurality of hierarchical levels with a highest level corresponding to the root elements;
   each hierarchical level includes one or more ordered sequences of elements;
   the one or more ordered sequences of elements are ordered based on one of element locations and element timestamps; and
   a K-level element represents a combination of all (K−1)-level subtree elements associated with the K-level element, wherein K is an integer greater than 1, and the (K−1)-level subtree elements is an ordered sequence.

2. The method according to claim 1, wherein:
   the first content sequence and the second content sequence are movie subtitles; and
   the hierarchical structure includes three levels of a "paragraph-sentence-word" structure.

3. The method according to claim 1, wherein:
   the first content sequence and the second content sequence are video contents; and
   the hierarchical structure includes four levels of a "scene-shot-frame-block" structure wherein a scene is a root element at a highest level and is a combination of one or more ordered shots as subtree elements associated with the scene; a shot is a third-level element and is a combination of one or more ordered frames as subtree elements associated with the shot a frame is a second-level element and is a combination of one or more ordered blocks as subtree elements associated with the frame; and a block is a first-level element.

4. The method according to claim 1, wherein determining a desired alignment between the first content sequence and the second content sequence further includes:
   determining an align pair for each of selected elements on a same hierarchical level from the first content sequence and the second content sequence;
   determining a distance of each align pair as a dissimilarity between the elements in the align pair; and
   determining a total distance of all align pairs of the selected elements as a total distance of an alignment between the selected elements of the first content sequence and the second content sequence.

5. The method according to claim 4, further including:
   determining a distance of root elements of the first content sequence and the second content sequence;
   determining a distance of sub-tree structure elements of the first content sequence and the second content sequence;
   determining a total distance of the first content sequence and the second content sequence, as a total distance of an alignment between the first content sequence and the second content sequence, based on the distance of root elements and the distance of sub-tree structure elements.

6. The method according to claim 5, wherein:
the root elements are represented by vector of features;
the values of the vector are Boolean or normalized real numbers in [0, 1]; and
a Euclidean distance is used as a measurement for a distance between vectors.

7. The method according to claim 5, further including:
recursively determining the total distances between the first content sequence and the second content sequence to find a minimum distance between the first content sequence and the second content sequence; and
determining an alignment with the minimum distance between the first content sequence and the second content sequence as the desired alignment between the first content sequence and the second content sequence.

8. The method according to claim 4, wherein:
when the align pair is at a K-level in the hierarchical structure, the dissimilarity between two elements in the align pair are obtained by combining a distance between feature vectors of the two elements of the align pair and a distance between two (K−1)-level subtree sequences associated with the two elements with a desired alignment.

9. The method according to claim 8, wherein:
provided that a K-level align pair is denoted as (s, t), the distance between feature vectors of the two elements of the align pair is denoted as $dis_r(K, r(s), r(t))$, the distance between two (k−1)-level subtree sequences associated with the two elements with a desired alignment is denoted as $DIS(K-1, sub(s), sub(t))$, the dissimilarity between two elements in the align pair are obtained by $$dis(K, s, t) = \begin{cases} dis_r(k, r(s), r(t)) \oplus DIS(k-1, sub(s), sub(t)), & K > 1 \\ dis_r(K, r(s), r(t)), & K = 1 \end{cases}$$

wherein ⊕ denotes a type of operation, including one of addition, weighted linear addition, multiplication, and sum of squares.

10. The method according to claim 4, wherein the align pair is one of:
a pair of an element of the first content sequence and an element of the second content sequence;
a pair of an element of the first content sequence or the second content sequence and null;
a pair of an element of the first content sequence and a partial sequence of the second content sequence; and
a pair of a partial sequence of the first content sequence and a partial sequence of the second content sequence;
wherein the partial sequence of the first content sequence or the partial sequence of the second content sequence includes a plurality of the selected elements from the first content sequence or a plurality of the selected elements from the second content sequence.

11. The method according to claim 8, wherein:
provided that, the selected elements of the first content sequence are k-level ordered sequence of elements denoted as X, the selected elements of the second content sequence are k-level ordered sequence of elements denoted as Y, $X_m = x_1 \ldots x_m$ represents a partial sequence consisting of first m elements in ordered sequence X, $X_{|X|\setminus m} = X - = x_{m+1} \ldots x_{|X|}$ represents a remaining part of X, $Y_n = y_1 \ldots y_n$ represents a partial sequence consisting of first n elements in ordered sequence Y, $Y_{|Y|\setminus n} = y_{n+1} \ldots y_{|Y|}$ represents a remaining part of Y, dis( ) denotes a distance between two elements, and DIS( ) denotes a total distance of an alignment between two sequences,
a minimum distance among the total distances of alignments between the selected elements of the first content sequence and the second content sequence is obtained by $$DIS(k, X_m, Y_n) = \min_{\substack{1 \le i < m \\ 1 \le j < n}} \begin{cases} DIS(k, X_{m-1}, Y_{n-1}) + dis(k, x_m, y_n), \\ DIS(k, X_{m-1}, Y_n) + dis(k, x_m, null), \\ DIS(k, X_m, Y_{n-1}) + dis(k, null, y_n), \\ DIS(k, X_{m-1}, Y_{j-1}) + dis(k, x_m, y_j \ldots y_n), \\ DIS(k, X_{i-1}, Y_{n-1}) + dis(k, x_i \ldots x_m, y_n), \\ DIS(k, X_{i-1}, Y_{j-1}) + dis(k, x_i \ldots x_m, y_j \ldots y_n) \end{cases}$$

$$= \min_{(i,j) \in [(0,0),(m,n)]} \{DIS(k, X_i, Y_j) + dis(k, x_{m\setminus i}, y_{n\setminus j})\}.$$

12. The method according to claim 1, wherein outputting results of the desired alignment further includes:
integrating aligned first content sequence and second content sequence to produce an integrated content sequence based on the desired alignment; and
displaying the integrated content sequence to a user.

13. A content alignment system, comprising:
a memory module;
an output interface; and
a processor coupled to the memory module and the output interface and configured to:
 obtain a first content sequence and a second content sequence different from the first content sequence;
 represent each of the first content sequence and the second content sequence in a hierarchical structure containing an ordered root element sequence and a sub-tree structure, wherein the ordered root element sequence includes a plurality of root elements and each root element is associated with a sub-tree of elements;
 determine a desired alignment between the first content sequence and the second content sequence using dynamic programming; and
 output results of the desired alignment between the first content sequence and the second content sequence through the output interface;
wherein:
the hierarchical structure is divided into a plurality of hierarchical levels with a highest level corresponding to the root elements;
each hierarchical level includes one or more ordered sequences of elements;
the one or more ordered sequences of elements are ordered based on one of element locations and element timestamps; and
a K-level element represents a combination of all (K−1)-level subtree elements associated with the K-level element, wherein K is an integer greater than 1, and the (K−1)-level subtree elements is an ordered sequence.

14. The content alignment system according to claim 13, wherein:
the first content sequence and the second content sequence are movie subtitles; and
the hierarchical structure includes three levels of a "paragraph-sentence-word" structure.

15. The content alignment system according to claim 13, wherein:
the first content sequence and the second content sequence are video contents; and
the hierarchical structure includes four levels of a "scene-shot-frame-block" structure, wherein a scene is a root element at a highest level and is a combination of one or more ordered shots as subtree elements associated with the scene; a shot is a third-level element and is a combination of one or more ordered frames as subtree elements associated with the shot; a frame is a second-level element and is a combination of one or more ordered blocks as subtree elements associated with the frame; and a block is a first-level element.

16. The content alignment system according to claim 13, wherein, to determine a desired alignment between the first content sequence and the second content sequence, the processor is further configured to:
determine an align pair for each of selected elements on a same hierarchical level from the first content sequence and the second content sequence;
determine a distance of each align pair as a dissimilarity between the elements in the align pair; and
determine a total distance of all align pairs of the selected elements as a total distance of an alignment between the selected elements of the first content sequence and the second content sequence.

17. The content alignment system according to claim 16, wherein the processor is further configured to:
determine a distance of root elements of the first content sequence and the second content sequence;
determining a distance of sub-tree structure elements of the first content sequence and the second content sequence;
determine a total distance of the first content sequence and the second content sequence, as a total distance of an alignment between the first content sequence and the second content sequence, based on the distance of root elements and the distance of sub-tree structure elements.

18. The content alignment system according to claim 17, wherein:
the root elements are represented by vector of features;
the values of the vector are Boolean or normalized real numbers in [0, 1]; and
a Euclidean distance is used as a measurement for a distance between vectors.

19. The content alignment system according to claim 17, wherein the processor is further configured to:
recursively determine the total distances between the first content sequence and the second content sequence to find a minimum distance between the first content sequence and the second content sequence; and
determine an alignment with the minimum distance between the first content sequence and the second content sequence as the desired alignment between the first content sequence and the second content sequence.

20. The content alignment system according to claim 13, wherein, to output results of the desired alignment, the processor is further configured to:
integrate aligned first content sequence and second content sequence to produce an integrated content sequence based on the desired alignment; and
display the integrated content sequence to a user.

* * * * *